(12) United States Patent
D'Anzi et al.

(10) Patent No.: US 11,362,347 B2
(45) Date of Patent: Jun. 14, 2022

(54) ADVANCED ELECTROLYTE MIXING METHOD FOR ALL VANADIUM FLOW BATTERIES

(71) Applicants: Angelo D'Anzi, Medicina (IT); Maurizio Tappi, Cesena (IT); Gianluca Piraccini, Cesena (IT); Carlo Alberto Brovero, Alexandria, VA (US)

(72) Inventors: Angelo D'Anzi, Medicina (IT); Maurizio Tappi, Cesena (IT); Gianluca Piraccini, Cesena (IT); Carlo Alberto Brovero, Alexandria, VA (US)

( * ) Notice: Subject to any disclaimer, the term of this patent is extended or adjusted under 35 U.S.C. 154(b) by 138 days.

(21) Appl. No.: 16/498,407

(22) PCT Filed: Mar. 27, 2018

(86) PCT No.: PCT/US2018/024531
§ 371 (c)(1),
(2) Date: Sep. 27, 2019

(87) PCT Pub. No.: WO2018/183301
PCT Pub. Date: Oct. 4, 2018

(65) Prior Publication Data
US 2020/0266465 A1 Aug. 20, 2020

Related U.S. Application Data

(60) Provisional application No. 62/476,936, filed on Mar. 27, 2017.

(51) Int. Cl.
*H01M 8/04* (2016.01)
*H01M 8/04082* (2016.01)
*H01M 8/18* (2006.01)

(52) U.S. Cl.
CPC ....... *H01M 8/04201* (2013.01); *H01M 8/188* (2013.01)

(58) Field of Classification Search
CPC .................. H01M 8/04201; H01M 8/188
USPC .............................................. 429/512
See application file for complete search history.

(56) References Cited

U.S. PATENT DOCUMENTS

2016/0006051 A1* 1/2016 Winter .............. H01M 8/04201
429/418
2017/0271694 A1* 9/2017 Jeong .................... H01M 8/188

* cited by examiner

*Primary Examiner* — James M Erwin
(74) *Attorney, Agent, or Firm* — Michael J. Foycik, Jr.

(57) ABSTRACT

A flow battery has an electrochemical stack, a positive electrolyte, a negative electrolyte, a positive electrolyte tank, and a negative electrolyte tank. The positive electrolyte and the negative electrolyte are respectively stored in the positive and negative tanks. A positive electrolyte pump, a negative electrolyte pump, a mixing pump is embedded in the bypass pipeline or in a dedicate circuit. The positive and the negative tanks, are mutually connected by means of a connection pipe, said connection pipe is embedded just immediately above the electrolyte levels.

1 Claim, 5 Drawing Sheets

ADVANCED ELECTROLYTE MIXING METHOD FOR ALL VANADIUM FLOW BATTERIES

CROSS REFERENCE TO RELATED APPLICATIONS

This application claims the priority of Provisional Application No. 62/476,936 filed on Mar. 27, 2017, entitled "AN ADVANCED ELECTROLYTE MIXING METHOD FOR ALL VANADIUM FLOW BATTERIES". The entire disclosure of this provisional patent application is hereby incorporated by reference thereto, in its entirety.

STATEMENT REGARDING FEDERALLY SPONSORED RESEARCH OR DEVELOPMENT

Not applicable.

FIELD OF THE INVENTION

The present invention relates to a flow battery, and particularly to a novel flow Battery module in which the balance of plant is strongly simplified.

BACKGROUND OF THE INVENTION

A flow battery is a type of rechargeable battery in which electrolytes that contain one or more dissolved electro-active substances flow through an electrochemical cell, which converts the chemical energy directly into electric energy. The electrolytes are stored in external tanks and are pumped through the cells of the reactor.

Redox flow batteries have the advantage of having a flexible layout (due to the separation between the power components and the energy components), a long life cycle, rapid response times, no need to smooth the charge, and no harmful emissions.

Flow batteries are used for stationary applications with an energy demand between 1 kWh and several MWh: they are used to smooth the load of the grid, where the battery is used to accumulate—during the night—energy at low cost, and return it to the grid when it is more expensive, but also to accumulate power from renewable sources such as solar energy and wind power, to then provide it during peak periods of energy demand.

In particular, a vanadium Redox battery includes a set of electrochemical cells in which the two electrolytes are separated by a proton exchange membrane. Both electrolytes are based on vanadium: the electrolyte in the positive half-cell contains $VO_4^+$ and $VO^{5+}$ ions while the electrolyte in the negative half-cell contains $V^{3+}$ and $V^{2+}$ ions. The electrolytes can be prepared in several ways, for example by electrolytic dissolution of vanadium pentoxide ($V_2O_5$) in sulfuric acid ($H_2SO_4$). The solution that is used remains strongly acidic. In vanadium flow batteries, the two half-cells are furthermore connected to storage tanks that contain a very large volume of electrolyte, which is made to circulate through the cell by means of pumps. Such circulation of liquid electrolytes requires a certain space occupation and limits the possibility to use vanadium flow batteries in mobile applications, in practice confining them to large fixed installations.

While the battery is being charged, in the positive half-cell the vanadium is oxidized, converting $VO_4^+$ into $VO^{5+}$. The removed electrons are transferred to the negative half-cell, where they reduce the vanadium from $V^{3+}$ to $V^{2+}$. During operation, the process occurs in reverse and one obtains a potential difference of 1.41V at 25° C. in an open circuit.

The vanadium Redox battery is the only battery that accumulates electric energy in the electrolyte and not on the plates or electrodes, as occurs commonly in all other battery technologies.

Differently from all other batteries, in the vanadium Redox battery the electrolyte contained in the tanks, once charged, is not subjected to auto-discharge, while the portion of electrolyte that is stationary within the electrochemical cell is subject to auto-discharge over time.

The quantity of electric energy stored in the battery is determined by the volume of electrolyte contained in the tanks.

According to a particularly efficient specific constructive solution, a vanadium Redox battery includes a set of electrochemical cells within which the two electrolytes, mutually separated by a polymeric membrane, flow. Both electrolytes are constituted by an acidic solution of dissolved vanadium. The positive electrolyte contains $V^{5+}$ and $V^{4+}$ ions, while the negative one contains $V^{2+}$ and $V^{3+}$ ions. While the battery is being charged, in the positive half-cell the vanadium oxidizes, while in the negatives half-cell the vanadium is reduced. During the discharge step, the process is reversed. The connection of multiple cells in an electrical series allows the increase of the voltage across the battery, which is equal to the number of cells multiplied by 1.41 V.

During the charging phase, in order to store energy, the pumps are turned on, making the electrolyte flow within the electrochemical related cell. The electric energy applied to the electrochemical cell facilitates proton exchange by means of the membrane, charging the battery.

During the discharge phase, the pumps are turned on, making the electrolyte flow inside the electrochemical cell, creating a positive pressure in the related cell thus releasing the accumulated energy.

During the operation of the battery there is a migration of electrolyte from one compartment to the other of the group of cells that constitute the stack, facilitated by the electromotive force of the process. This causes a change in the levels of electrolyte in the tanks, where the level in one tank rises and the level in the other tank lowers.

With the purpose of keeping the levels of electrolyte in the tanks in equilibrium, a connection by-pass tube is placed under the liquid levels connecting the two tanks.

When the battery is in operation for a long period, an imbalance in the concentrations of the vanadium species that compose the electrolytes occurs. It is therefore necessary, at a predefined periodic interval, to mix both the electrolytes to ensure that there is an equal concentration of vanadium in the anode and in the cathode. It is evident that by mixing the two electrolytes the battery goes into a non-operational state and the delivered voltage is equal to zero (there is no difference in electric potential across the battery) since both compartments contain vanadium at the oxidation state of 3.5. To return to a discharged battery state of V3+ and V4+, an energy expenditure is necessary equal to a half charge to condition the electrolyte in both tanks. Only after conditioning, recharging of the battery is possible.

To perform this electrolyte mixing operation, it is necessary to have embedded hydraulic circuits that mutually couple the intakes and the outlets of the tanks in order to allow the electrolyte flows to mix together.

The hydraulic mixing circuits are composed of several valves which are manually or electrically-operated, that can be subject to malfunctions caused indeed by their limited use, and in addition to that the above-mentioned hydraulic mixing circuits increase the overall cost of the battery.

The aim of the present invention is to solve the problems described above, devising a flow battery that totally eliminates valves and includes limited hydraulic circuits. This design is also less expensive than batteries of the known art and is less likely to be subject to failures and malfunctions.

DESCRIPTION OF THE RELATED ART

FIG. 1 is a schematic view showing a conventional vanadium redox flow battery. As shown in FIG. 1, the conventional vanadium redox flow battery includes an electrochemical stack 1, a positive electrolyte 5, a negative electrolyte 4, a positive electrolyte tank 3, and a negative electrolyte tank 2. The positive electrolyte 5 and the negative electrolyte 4 are respectively stored in tank 3 and tank 2. At the same time, the positive electrolyte 5 and the negative electrolyte 4 respectively pass through the electrochemical stack 1 via the connection pipelines to form the respective loops indicated in FIG. 1 with arrows. The positive and negative electrolytes are indicated by different shading in FIG. 1. A pump 6 and a pump 7 are typically installed on the connection pipelines for continuously transporting the electrolytes to the electrodes in the stack 1. An anodic three-way valve 8, and a cathodic three-way valve 9 are embedded in the pipe line with the purposes of exchanging the flow direction of both lines in order to remix the positive and negative electrolyte being contained in the respective tanks 3 and tanks 2. A bypass pipe 13 is embedded, under the electrolyte levels, connecting the positive electrolyte tank 3 to the negative electrolyte tank 2, with the purposes of maintaining in equilibrium the levels of both the electrolytes being contained into the tanks. The flow in the bypass pipeline 13 can go in either direction, as indicated by the arrows along the bypass pipeline 13 in FIG. 1.

Moreover, a power conversion unit 11, e.g. a DC/AC converter, can be used in a vanadium redox flow battery, and the power conversion unit 11 is respectively electrically connected to the stack 1 via the positive pole and the negative pole connection lines, and the power conversion unit 11 also can be respectively electrically connected to an external input power source 12 and an external load 10 in order to convert the AC power generated by the external input power source 12 to DC power for charging the vanadium redox flow battery, or convert the DC power discharged by the vanadium redox flow battery to AC power for outputting to the external load 10.

In FIG. 1, which is a schematic view of the conventional flow battery according to the state of the art, an operation mode is shown in which the positive three-way valve 9 has switched to direct the positive electrolyte flow received from the pump 6 to the cathode circuit of the stack 1 and shows its return to the respective positive tank 3.

Also in FIG. 1, which is a schematic view is shown of a conventional flow battery according to the state of the art, the operation mode is shown in which the negative three-way valve 8 has switched to direct the negative electrolyte flow received from the pump 7 to the anode circuit of the stack and return to the respective negative tank 2.

FIG. 2 is a schematic view of a conventional flow battery according to the state of the art, similar to that of FIG. 1, showing a mixing mode, in which the negative three-way valve 8 has switched the negative electrolyte flow from the pump 7 into the positive tank 3 bypassing the anode circuit of the stack 1 and instead returning it to the opposite positive tank 3, causing mixing of both the negative and positive electrolytes (the negative and positive electrolytes being shown by different shading in FIG. 2).

However, there are disadvantages of the above-mentioned conventional flow battery design according to the state of the art, caused by the complexity of the plant due to the three-way valves and the respective pipes embedded as discussed above.

An additional disadvantage of the above mentioned conventional flow battery design according to the state of the art, is that the above-noted three-way valves and the respective pipes in time are subject to leakage from their several connection points present in the pipe circuits, potentially causing damage to the entire battery.

Therefore, there is a need for providing a simpler vanadium redox flow battery design, in order to solve the problems presented by the conventional flow battery designs described above, to achieve improved reliability and reducing the manufacturing cost thus shortening the payback of the investment.

SUMMARY OF THE INVENTION

An object of the present invention is to provide a vanadium redox flow battery module, having an electrochemical stack 1, a positive electrolyte 5, a negative electrolyte 4, a positive electrolyte tank 3, and a negative electrolyte tank 2, the positive electrolyte 5 and the negative electrolyte 4 are respectively stored in tank 2 and tank 3. At the same time, the positive electrolyte 5 and the negative electrolyte 4 respectively pass through the electrochemical stack 1 via the connection pipelines to form the respective loops also indicated in FIG. 3 with arrows. A pump 6 and a pump 7 are typically installed on the connection pipelines for continuously transporting the respective electrolytes to the electrodes in the stack 1. A bypass pipe 13 is embedded under the electrolyte levels, connecting the positive electrolyte tank 3 to the negative electrolyte tank 2, with the purpose of maintaining in equilibrium the levels of both the electrolytes being contained in the respective tanks 2 and 3. In the bypass pipe 13, a mixing pump 14 is embedded that in the operation mode is turned off, whereas in the mixing mode the mixing pump 14 is turned on, pumping the negative electrolyte 4 being contained in the negative electrolyte tank 2 into the positive electrolyte tank 3 in the direction indicated by the arrow pointing to the right in FIG. 3, mixing both the electrolytes together. During this mixing phase an increase of electrolyte level in the positive electrolyte tank 3 occurs. The positive tank 3 and the negative tank 2 are mutually connected by a connection pipe 15, and the connection pipe 15 is disposed just immediately above the electrolyte levels, e.g. 2 cm above the electrolyte levels.

As shown in FIG. 4, in the mixing mode with the mixing pump 14 turned on, the electrolyte level in the positive electrolyte tank 3 increases, and by means of the connection pipe 15 the electrolyte in excess in the tank 3 is returned into the negative electrolyte tank 2. The positive and negative electrolytes are distinguished by different shading, as seen in FIG. 4. When mixing mode is ended and the pump 14 is turned off, by means of the bypass pipe 13 the equalization of the levels in the two tanks occurs maintaining in equilibrium the electrolyte levels and providing an efficient electrolyte mix.

As shown in FIG. 5, the mixing pump 14 is alternatively embedded in a dedicated pipeline circuit 16 above the electrolyte level. The pipeline circuit 16 has one end 18 in the tank 2 and an opposite end 17 in the tank 3. During operations of the battery, the mixing pump 14 is off and the pipeline circuit 16 does not function as a bypass for the equalization of the electrolyte levels. In this view, end 18 serves as a suction end. The suction pipe end 18 as seen in FIG. 5 is deeper in the electrolyte tank 2 than the discharging pipe end 17 is in the tank 3, wherein the end 17 is touching the top of the electrolyte at the default level.

As shown in FIG. 6, after the completion of the mixing mode when the mixing pump 14 is turned off, the equalization of the levels occurs via the pipeline circuit 16 as shown by the return arrows until the level of the electrolyte 5 reaches the end 17 (duct 17). Air will enter causing in the pipeline circuit 16 to empty ending the electrolyte equalization. The suction pipe end 18 as seen in FIG. 6 is deeper in the electrolyte tank 2 than the discharging pipe end 17 is in the tank 3, wherein the end 17 is touching the top of the electrolyte at the default level.

A further object of the present invention is providing a flow battery relatively simple and less expensive and is safer in application.

BRIEF DESCRIPTION OF THE DRAWINGS

Further characteristics and advantages of the invention will become better apparent from the description of a preferred but not exclusive embodiment of the flow battery according to the invention, illustrated by way of a non limiting example in the accompanying drawings, wherein:

FIG. 6 is a schematic view of a vanadium flow battery according to the present invention wherein the leveling of the electrolyte occurs via another overhead pipeline.

DETAILED DESCRIPTION OF THE INVENTION

Figure 1:
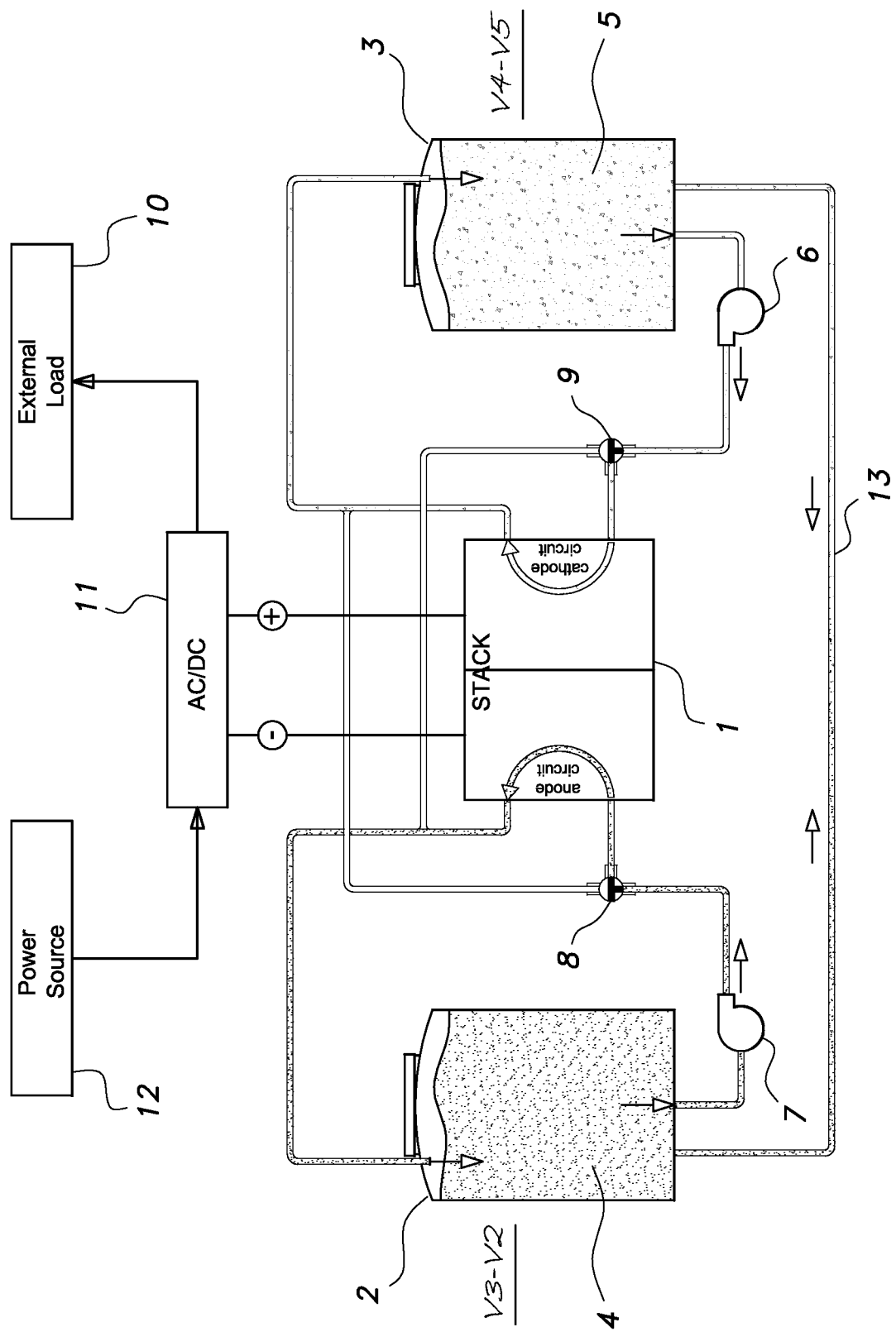
FIG. 1 is a schematic view showing a conventional vanadium redox flow battery in operation mode.
Figure 2:
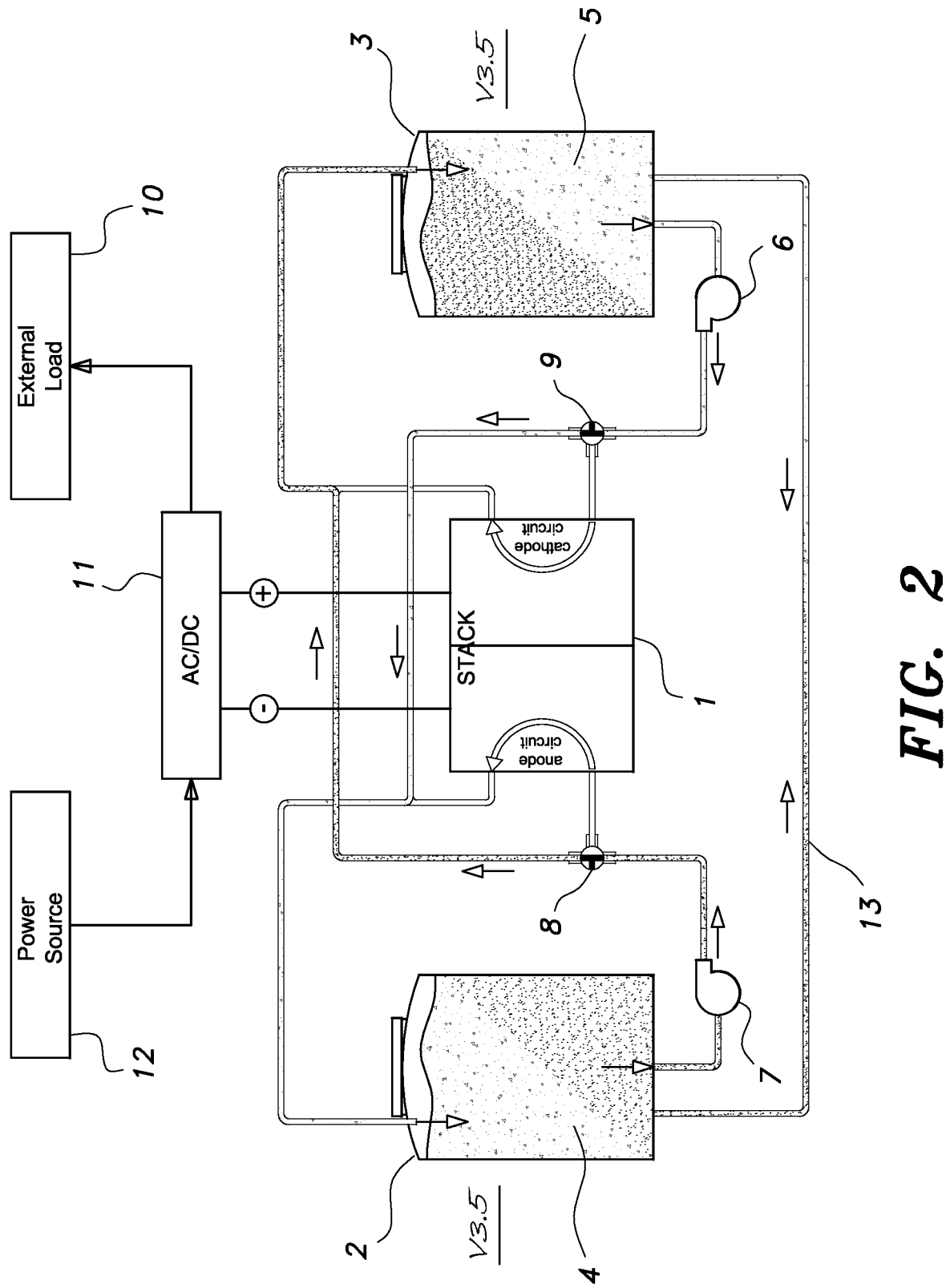
FIG. 2 is a schematic view showing a conventional vanadium redox flow battery in mixing mode.
Figure 3:
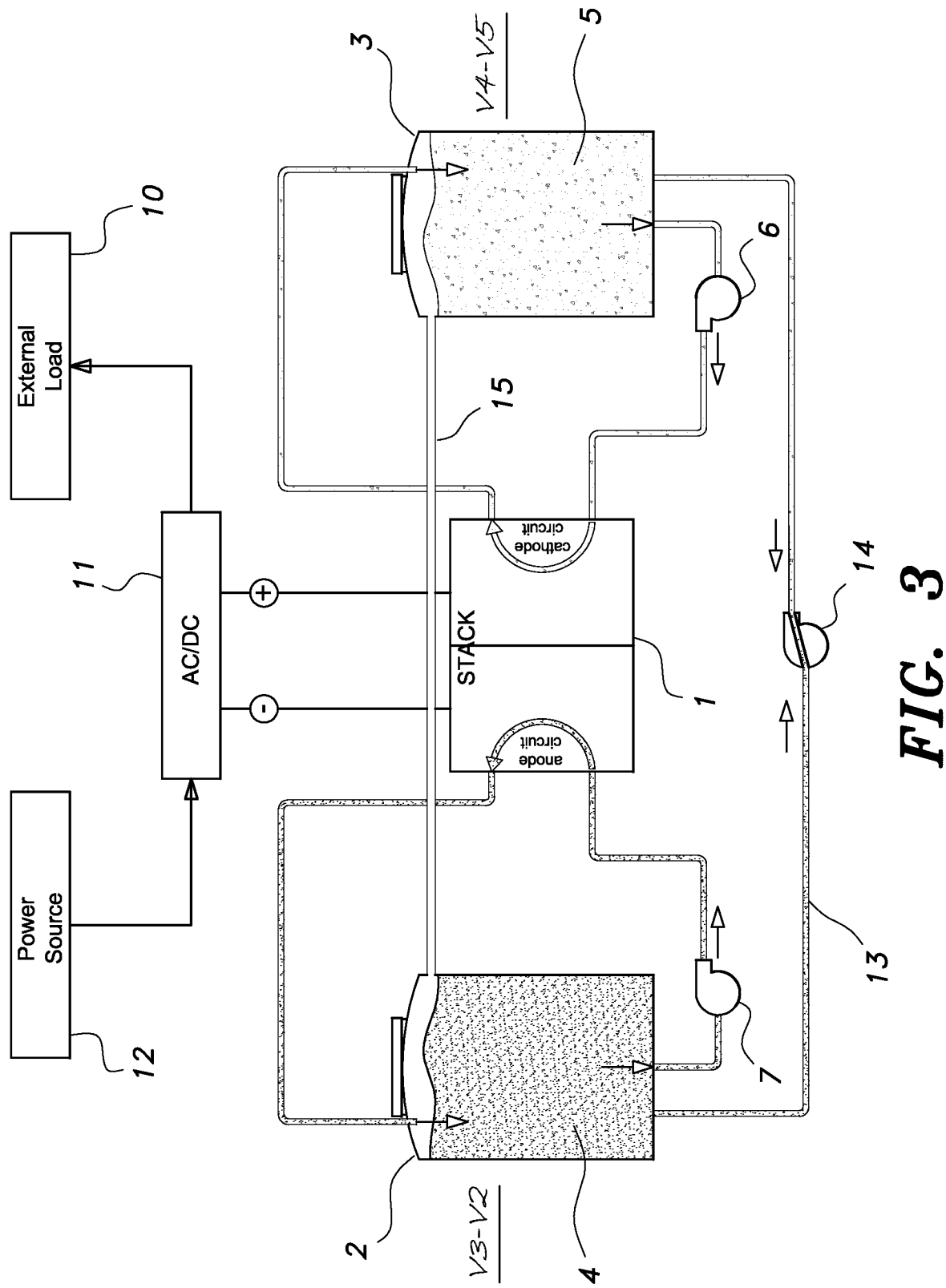
FIG. 3 is a schematic view of a vanadium flow battery according to the present invention in operation mode, wherein the mixing pump is embedded in the bypass.

In FIG. 3 the flow battery module according to the invention is shown, which includes: at least an electrochemical stack 1, a positive electrolyte 5, a negative electrolyte 4, a positive electrolyte tank 3, and a negative electrolyte tank 2. The positive electrolyte 5 and the negative electrolyte 4 are respectively stored in the tank 3 and the tank 2. A positive electrolyte pump 6 and a negative electrolyte pump 7 are provided. A bypass pipe 13 is embedded below the electrolyte levels connecting the positive electrolyte tank 3 to the negative electrolyte tank 2, and a mixing pump 14 is embedded in the bypass pipe 13. The positive tank 3 and the negative tank 2 are mutually connected by means of a connection pipe 15, wherein the connection pipe 15 is disposed just immediately above the electrolyte levels, e.g. 2 cm above.

In the bypass pipe 13, a mixing pump 14 is embedded that in the operation mode is turned off, whereas in the mixing mode the mixing pump 14 is turned on, pumping the negative electrolyte 4 being contained in the negative electrolyte tank 2 into the positive electrolyte tank 3 in the direction indicated by the arrow pointing to the right in FIG. 3, mixing both the electrolytes together. During this mixing phase an increase of electrolyte level in the positive electrolyte tank 3 occurs. The positive tank 3 and the negative tank 2 are mutually connected by a connection pipe 15, and the connection pipe 15 is disposed just immediately above the electrolyte levels, e.g. 2 cm above the electrolyte levels.

In FIG. 3, in the flow battery module according to the present invention, with the purpose of keeping the electrolyte levels in equilibrium in the tanks, a bypass pipe line 13 can be placed below the liquid levels connecting both the electrolyte tanks 2 and 3 allowing the electrolyte flows to flow in either of two opposed directions.

In FIG. 3, in the flow battery module according to the present invention, the mixing pump 14 during the operation mode is turned off.

Figure 4:
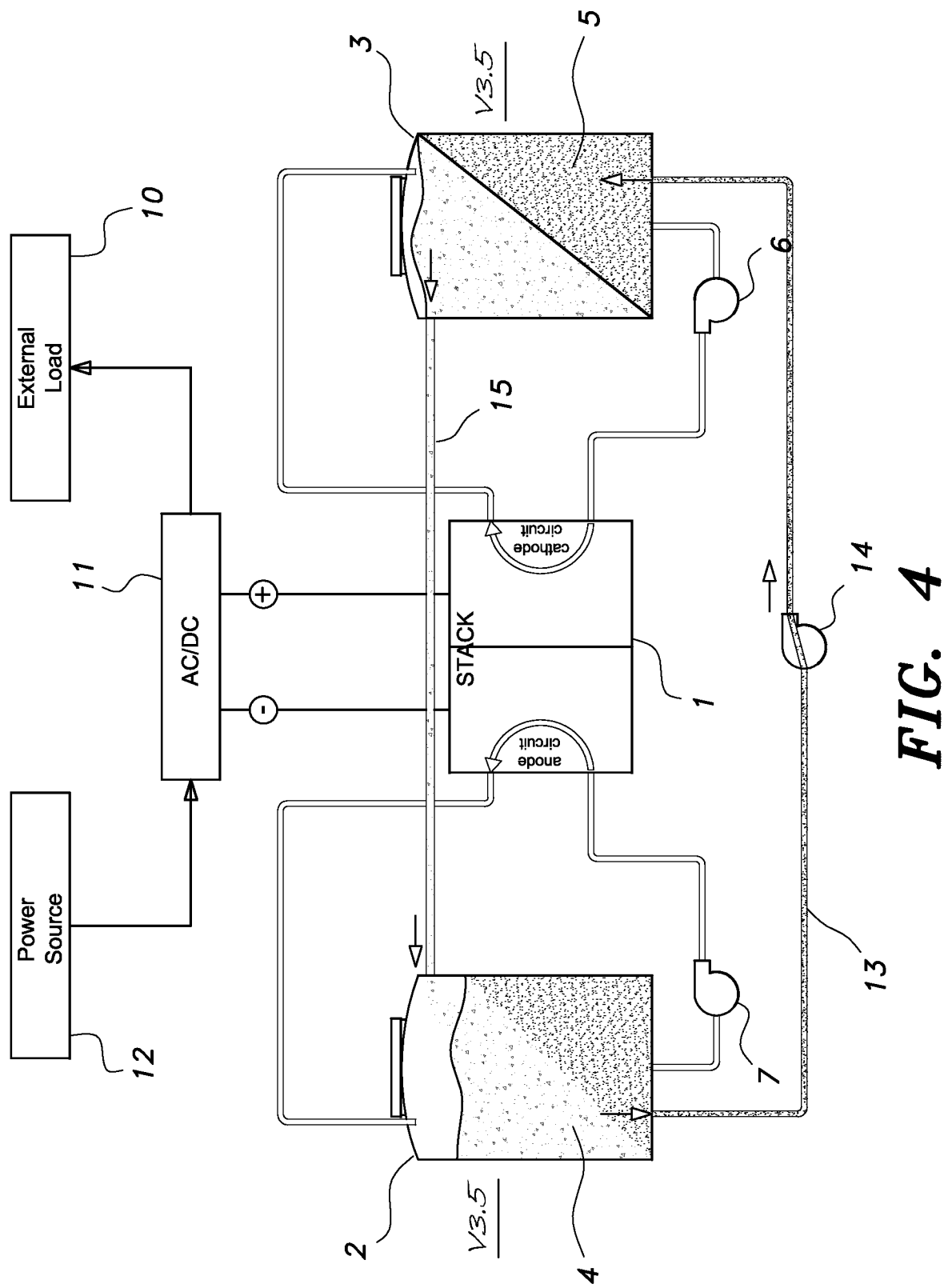
FIG. 4 is a schematic view of a vanadium flow battery according to the present invention in mixing mode, wherein the mixing pump is embedded in the bypass.

As shown in FIG. 4, in the mixing mode with the mixing pump 14 turned on, the electrolyte level in the positive electrolyte tank 3 increases, and by means of the connection pipe 15 the electrolyte in excess in the tank 3 is returned into the negative electrolyte tank 2. The positive and negative electrolytes are distinguished by different shading, as seen in FIG. 4. When mixing mode is ended and the pump 14 is turned off, by means of the bypass pipe 13 the equalization of the levels in the two tanks occurs maintaining in equilibrium the electrolyte levels and providing an efficient electrolyte mix.

In FIG. 4, in the flow battery module according to the present invention, the mixing pump 14 during the mixing mode is turned on, pumping the negative electrolyte being contained in the negative electrolyte tank 2 into the positive electrolyte tank 3, mixing both the electrolytes together.

In FIG. 4, in the flow battery module according to the present invention, during the mixing mode an increase of electrolyte level in the positive electrolyte tank 3 occurs.

In FIG. 4, in the flow battery module according to the present invention, the positive tank 3 and the negative tank 2 are mutually connected by means of a connection pipe 15, and the connection pipe 15 is embedded just immediately above the electrolyte levels, e.g. 2 cm above.

In FIG. 4, in the flow battery module according to the present invention, during mixing mode, the excess of mixed electrolyte pumped in the positive electrolyte tank 3 is returned in the negative electrolyte tank 2 by means of the connection pipe 15. When mixing mode is ended and the pump 14 is turned off, by means of the bypass 13 the equalization of the levels in the two tanks occurs maintaining in equilibrium the electrolyte levels and providing an efficient electrolyte mix.

Figure 5:
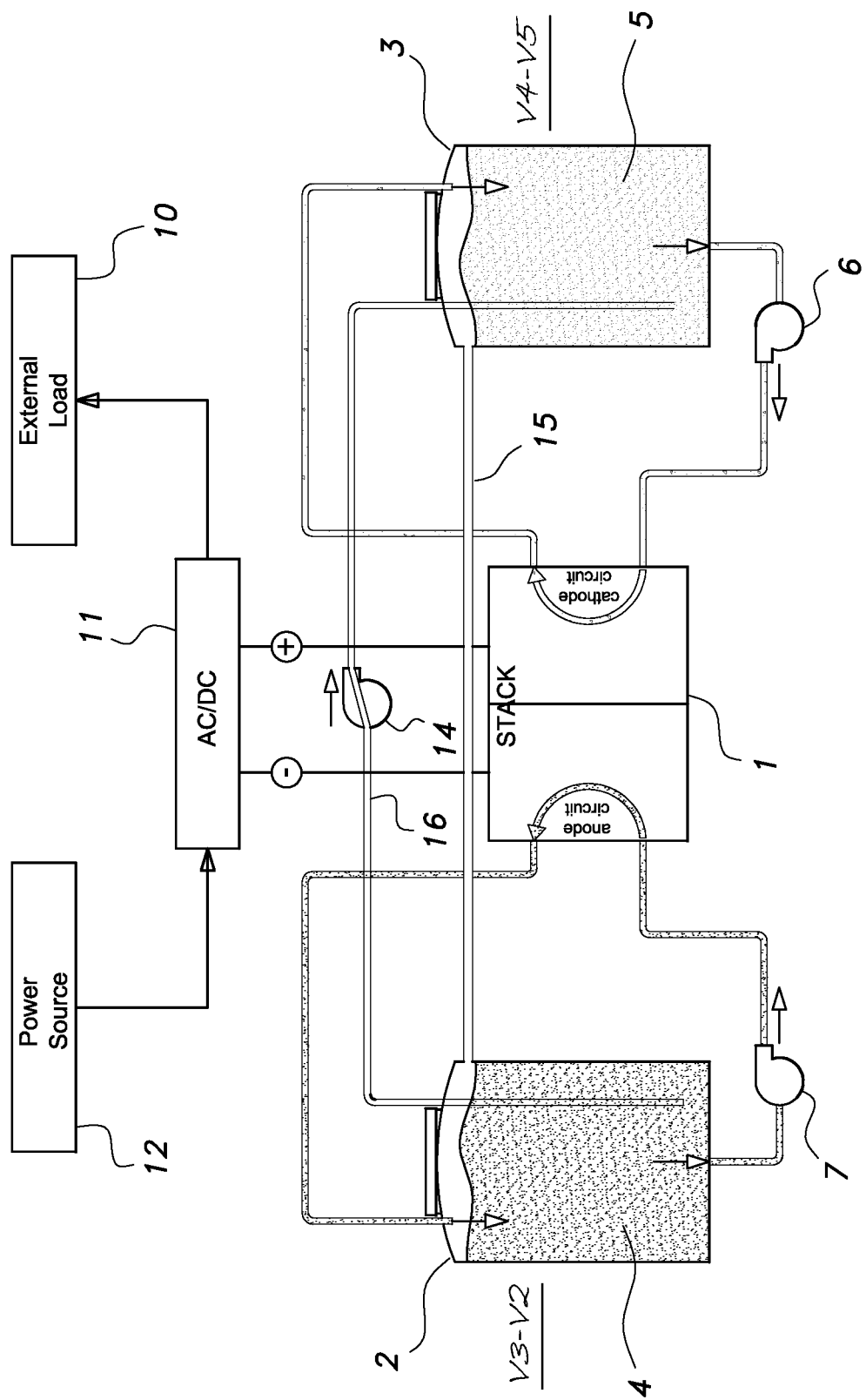
FIG. 5 is a schematic view of a vanadium flow battery according to the present invention having an overhead pipe having two ends, wherein one end is a suction pipe which is deeper in the electrolyte tank 2 near the bottom, and the discharging pipe 17 in the tank 3 is touching the top of the electrolyte at the default level.

As shown in FIG. 5, the mixing pump 14 is alternatively embedded in a dedicated pipeline circuit 16 above the electrolyte level. The pipeline circuit 16 has one end 18 in the tank 2 and an opposite end 17 in the tank 3. During operations of the battery, the mixing pump 14 is off and the pipeline circuit 16 does not function as a bypass for the equalization of the electrolyte levels. In this view, end 18 serves as a suction end. The suction pipe end 18 as seen in FIG. 5 is deeper in the electrolyte tank 2 than the discharging pipe end 17 is in the tank 3, wherein the end 17 is touching the top of the electrolyte at the default level.

In FIG. 5, in the flow battery module according to the present invention, in the alternative a mixing pump 14 is disposed in a dedicated pipeline circuit 16 not necessarily below the electrolyte level (in FIG. 5, the horizontal portion is disposed above the electrolyte level, and two ends 17 and 18 are disposed respectively near the top of the electrolyte level (end 17) and near the bottom of the electrolyte level (end 18). The positive tank 3 and the negative tank 2 are mutually connected by means of a connection pipe 15. The connection pipe 15 is disposed just immediately above the electrolyte levels, e.g. 2 cm above.

Moreover, a power conversion unit 11, e.g. a DC/AC converter, can be used in a vanadium redox flow battery, and the power conversion unit 11 is respectively electrically connected to the stack 1 via the positive pole and the negative pole connection lines, and the power conversion unit 11 also can be respectively electrically connected to an external input power source 12 and an external load 10 in order to convert the AC power generated by the external input power source 12 to DC power for charging the vanadium redox flow battery, or convert the DC power discharged by the vanadium redox flow battery to AC power for outputting to the external load 10.

As shown in FIG. 6, after the completion of the mixing mode when the mixing pump 14 is turned off, the equalization of the levels occurs via the pipeline circuit 16 as shown by the return arrows until the level of the electrolyte 5 reaches the end 17 (duct 17). Air will enter causing in the pipeline circuit 16 to empty ending the electrolyte equalization. The suction pipe end 18 as seen in FIG. 6 is deeper in the electrolyte tank 2 than the discharging pipe end 17 is in the tank 3, wherein the end 17 is touching the top of the electrolyte at the default level. The equilibrium the electrolyte levels will be maintained also providing an efficient electrolyte mix.

Where technical features mentioned in any claim are followed by reference signs, those reference signs have been included for the sole purpose of increasing the intelligibility of the claims and accordingly such reference signs do not have any limiting effect on the interpretation of each element identified by way of example by such reference signs.

The invention being thus described, it will be evident that the same may be varied in many ways by a routineer in the applicable arts. Such variations are not to be regarded as a departure from the spirit and scope of the invention and all such modifications are intended to be included within the scope of the claims.

What is claimed is:

1. A flow battery, comprising:
    at least one electrochemical stack;
    a positive electrolyte having a positive electrolyte level;
    a negative electrolyte having a negative electrolyte level;
    a positive electrolyte tank;
    a negative electrolyte tank; wherein said positive electrolyte is stored in said positive electrolyte tank; and wherein said negative electrolyte is stored in said negative electrolyte tank; and
    a positive electrolyte pump;
    a negative electrolyte pump;
    a bypass pipe embedded below said positive electrolyte level and said negative electrolyte level; said bypass pipe connecting said positive electrolyte tank to said negative electrolyte tank; and
    a mixing pump disposed in said bypass pipe; and
    a connection pipe, wherein said positive tank and said negative tank are mutually connected by said connection pipe; and wherein said connection pipe is embedded immediately above said positive electrolyte level and said negative electrolyte level;
    and in which a mixing mode exists during which time said mixing pump operates to mix electrolytes; and wherein said connection pipe is embedded approximately 2 cm above said positive electrolyte level and said negative electrolyte level, for returning excess amounts of electrolytes accumulated during said mixing mode.

\* \* \* \* \*